(12) United States Patent
Isobe et al.

(10) Patent No.: US 7,326,429 B2
(45) Date of Patent: Feb. 5, 2008

(54) STERILIZATION METHOD OF RICE AND PROCESSED RICE FOODSTUFFS

(75) Inventors: Seiichiro Isobe, Ibaraki (JP); Kunihiko Uemura, Ibaraki (JP); Kyoichiro Yosida, Ibaraki (JP); Chang-Yeong Lee, Jeju-do (KR); Sang-You Kim, Pusan (KR)

(73) Assignee: CJ Cheiljedang Corp., Seoul (KR)

( * ) Notice: Subject to any disclaimer, the term of this patent is extended or adjusted under 35 U.S.C. 154(b) by 29 days.

(21) Appl. No.: 10/371,259

(22) Filed: Feb. 21, 2003

(65) Prior Publication Data

US 2004/0105920 A1   Jun. 3, 2004

(30) Foreign Application Priority Data

Nov. 28, 2002   (KR) .................... 10-2002-0074690

(51) Int. Cl.
*A23B 9/30*   (2006.01)

(52) U.S. Cl. .................... 426/331; 426/321; 426/335; 426/507; 426/532; 426/629

(58) Field of Classification Search ................ 426/321, 426/335, 532, 629, 418, 419, 442, 443
See application file for complete search history.

(56) References Cited

U.S. PATENT DOCUMENTS 6,050,178 A * 4/2000 Uemura ........................ 99/451
6,056,884 A * 5/2000 Uemura ...................... 210/748

FOREIGN PATENT DOCUMENTS

| JP | 1180293 | | 7/1989 |
| JP | 407255392 | * | 10/1995 |
| JP | 08-332487 | * | 12/1996 |
| JP | 409224592 | * | 9/1997 |
| JP | 2001-231313 | * | 8/2001 |
| JP | 02001211709 | * | 8/2001 |

* cited by examiner

*Primary Examiner*—Carolyn Paden
(74) *Attorney, Agent, or Firm*—Mathews, Shepherd, McKay & Bruneau, P.A.

(57) ABSTRACT

The present invention relates to an effective sterilization method including cooking and heating processes, which prevents the quality deterioration of rice and processed rice foodstuffs manufactured by heating processes.

3 Claims, 5 Drawing Sheets

STERILIZATION METHOD OF RICE AND PROCESSED RICE FOODSTUFFS

TECHNICAL FIELD

The present invention relates to a sterilization method for rice and processed rice foodstuffs, and more particularly relates to an effective sterilization method, which prevents the quality deterioration of rice and processed rice foodstuffs manufactured by heating processes. In the sterilization method of the present invention, raw rice is processed by contact treatment with alkaline aqueous solution and immersion treatment in strong acid water before the cooking and heating process. Ionized water made by an electrolytic water producer under a salt-free state, strong alkaline water obtained by an electrolytic water producer with salt added, or sodium hydroxide solution is used as the alkaline aqueous solution of the present invention.

BACKGROUND ART

When producing rice and processed rice foodstuffs through cooking or heating, the immersion treatment is conducted. Because in immersion treatment the rice itself generally absorbs water, it is difficult to use chemical treatment. To make possible the safekeeping of rice in ambient temperature, the rice must be heat-processed long enough.

Heating rice at temperatures over 130° C. removes heat-resistant spore-forming bacteria but reduces the quality of rice. Therefore, an effective, nonchemical sterilization method is required that does not cause the deterioration of the quality of the processed rice.

JP Pat. No. 2626778 discloses that acid aqueous anode solution made from a weak saline solution electrolyzed through a diaphragm has germicidal power. However, the technique has problems in that a sufficient sterilization effect may not be obtained, and the odor and the low potential of hydrogen level (pH 1.5~3.1) of the available chlorine, which serves as the principal sterilizing agent, reduces the quality of the processed rice.

DISCLOSURE OF THE INVENTION

Accordingly, the present invention, taking the above circumstances into consideration, aims to provide a new, effective sterilization method for rice and processed rice foodstuffs which does not utilize chemicals, and therefore totally prevents the quality of the processed rice from being degraded.

The present inventors conducted repeated researches to solve the problems of conventional techniques. Surprisingly, the object of the present invention can be accomplished through conducting, contact treatment with alkaline solution and immersion treatment in strong acid water before cooking and heating rice.

To accomplish the above object, the present invention provides a sterilization method for rice and processed rice foodstuffs, where the contact treatment with an alkaline solution and the immersion treatment in strong acid water are conducted before cooking and heating rice.

The alkaline aqueous solution used in the present invention can be ionized water made by an electrolytic water producer under salt-free state, or strong alkaline water obtained by an electrolytic water producer with salt added, or sodium hydroxide solution. Hereinafter, the present invention is described in detail with the following embodiments. The present invention is a characteristic sterilization method, in that contact treatment with an alkaline solution and the immersion treatment in strong acid water are conducted before cooking and heating rice.

The present invention is related to the sterilization method of processed rice foodstuffs, including the cooking and heating process. Rice is generally manufactured by heating after immersion in water, while processed rice foodstuffs, such as rice cake and rice-confectionery, are typically manufactured through the heating process. The present invention can also be applied to other products manufactured via the heating process. The sterilization method according to the present invention can effectively kill heat-resistant bacteria (heat-resistant spore forming bacteria, etc.), which is impossible in common heating processes.

In the present invention, the contact treatment with an alkaline solution and the immersion treatment in strong acid water are conducted before cooking and heating rice. Because the germicidal effect is inefficient when the rice bran is not removed, brown rice or the polished rice is used.

Any alkaline aqueous solution, which is in common use, can be utilized without special limit, and it is desirable to use alkaline ionized water made by an electrolytic water producer under salt-free state, strong alkaline water obtained by an electrolytic water producer with salt added, or sodium hydroxide solution.

Alkaline ionized water and the strong alkaline water can be obtained by using the generally used electrolytic water producer.

The pH of the strong alkaline water is not specially restricted, but it is preferable to use the alkaline water with a pH level of 10~12. The contact treatment of rice with alkaline aqueous solution is conducted in combination with the sterilization treatment by immersing rice in the strong acid water, and the efficient germicidal effect cannot be obtained by using only contact treatment.

Using only contact treatment in combination with the sterilization treatment, a sufficient germicidal effect and repression effect of the quality deterioration can be obtained.

The technique of washing and immersion can be adopted as the contact treatment method, but using washing technique only can produce the desired effect.

Washing for only 5 min or so can produce enough effect. Moreover, because a prolonged immersion doesn't improve the germicidal effect, a 30-min immersion treatment is preferable. The contact time of rice with alkaline aqueous solution and the usage of that alkaline solution are preferably adjusted according to the characteristic of the raw material.

In the present invention, the immersion treatment must be conducted after the contact treatment with alkaline aqueous solution. Moreover, in accordance with requirement, an effect of preliminary sterilization can be obtained by immersing raw rice in the strong acid water before conducting the contact treatment with alkaline aqueous solution, and the contamination on the rice can be removed by repeat contact treatment after the immersion treatment in strong acid water.

Strong acid water made by an electrolytic water producer under the state of adding or not adding soluble dissociative inorganic material (e.g., salt) can be used in the immersion treatment. Acid aqueous solution (strong acid electrolytic water) including hypochlorous acid (HClO), which is produced by electrolysis of weak chlorine water, is publicly known. The pH level of the strong acid water is not specially limited, but acid water with a pH level of 2.2~2.7 is commonly used.

A 1-h immersion time in strong acid water is allowable, but a 30-min immersion is sufficient to produce the desired effect. The contact time of rice with strong acid water and the usage of that acid water are preferably controlled according to the characteristic of the raw material.

Similarly, washing rice with the distilled water can be preferably utilized before or after the preliminary contact treatment with alkaline aqueous solution and the immersion treatment in the strong acid water. The time for washing treatment with the distilled water can be 5 up to 30 min. Consequently, rice cooking and manufacturing processed rice foodstuffs through heating process can be done via the preliminary contact treatment with alkaline aqueous solution and the immersion treatment in strong acid water. Cooking and heating treatment can be carried out according to the common processes, and the conditions of the common processes can be utilized.

In Rice and the processed rice foodstuffs manufactured through the sterilization method of the present invention, the presence of heat-resistant spore forming bacteria is effectively diminished. And because high-temperature treatment is not necessary, the quality is not reduced.

BRIEF DESCRIPTION OF THE DRAWINGS

The above objects and other advantages of the present invention will become more apparent by describing the preferred embodiment of the present invention in more detail with reference to the attached illustrations.

BEST MODES FOR CARRYING OUT THE INVENTION

Hereinafter, the preferred embodiments of the present invention are described in detail with reference to the examples.

EXAMPLE 1

High-milled rice (Koshihikari cultivated in Ibaraki in 2001) was used as the test rice. Distilled water (described as D/W and Distilled in drawings), and strong acidic electrolytic water and strong alkaline electrolytic water (described as AcEW in drawings) made from tap water by electrolytic water producer (Hoshizaki Electronics, ROX-20TA) were utilized as the test water. Twenty grams of test rice was put into a 100-ml beaker and 50 ml of test water was added into that beaker. By agitating that beaker, the rice was washed. After that, more water was added and the test rice was immersed in that water for 1 h. Water was extracted by using a stainless steel wire netting. Color and pH were measured by a calorimeter (CHROMA-meter CR300) and a pH-meter (pH meter D-22, HORIBA).

To improve the germicidal effect of the electrolytic water, the rice was washed with running water. Then the numbers of the general bacteria and heat-resistant bacteria were detected. Heat-resistant bacteria was handled in 80° C. for 10 min and then cultivated. Then the number of heat-resistant bacteria was detected.

To estimate the quality of the raw rice when using the test water, raw rice was washed and immersed, then its pH and color were measured. The results of that measurement were described in FIG. 1 and FIG. 2. The L-value in FIG. 2 indicates the degree of whiteness, a-value redness, and b-value yellowness.

Figure 1:
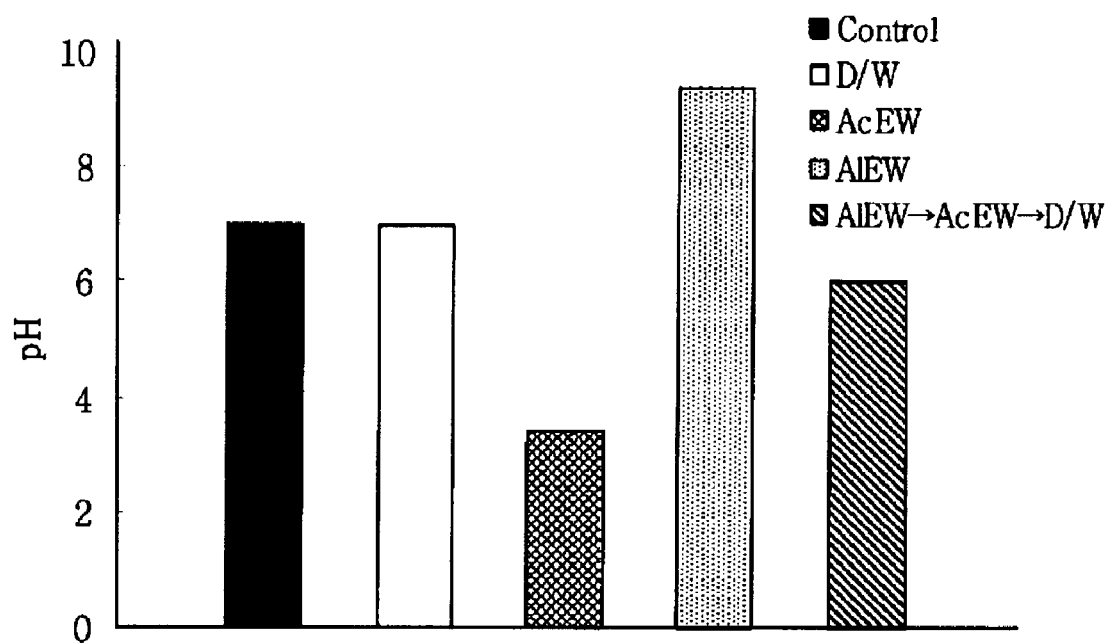
FIG. 1 is a graph of the pH level measured in example 1.

As described in FIG. 1, the natural pH level of raw rice hovers around neutrality. When treated with distilled water, the pH level of the raw rice did not change so much. But after being immersed in strong acidic electrolytic water for 1 h (AcEW), the pH level of the raw rice declined to 3.4, and after being immersed in strong alkaline electrolytic water (AlEW), the pH level turned to 9.4.

On the other hand, when the raw rice was 1) washed with strong alkaline electrolytic water for 5 min, 2) immersed in the strong acidic electrolytic water for 30 min, and 3) immersed in distilled water for 30 min (AlEW→AcEW→D/W), the pH level of the raw rice changed to 6.0 as described in FIG. 1. That change in pH level is assumed to be the result of the fact that the raw rice absorbs the electrolytic water during immersion.

When the raw rice, immersed only in the electrolytic water before, was treated with the strong acidic electrolytic water (AcEW), it turned brown, and when treated with the strong alkaline electrolytic water (AlEW) it turned green. This color change is caused by discoloration of the proteins and carbohydrates in the rice bran due to the change in pH level.

Figure 2:
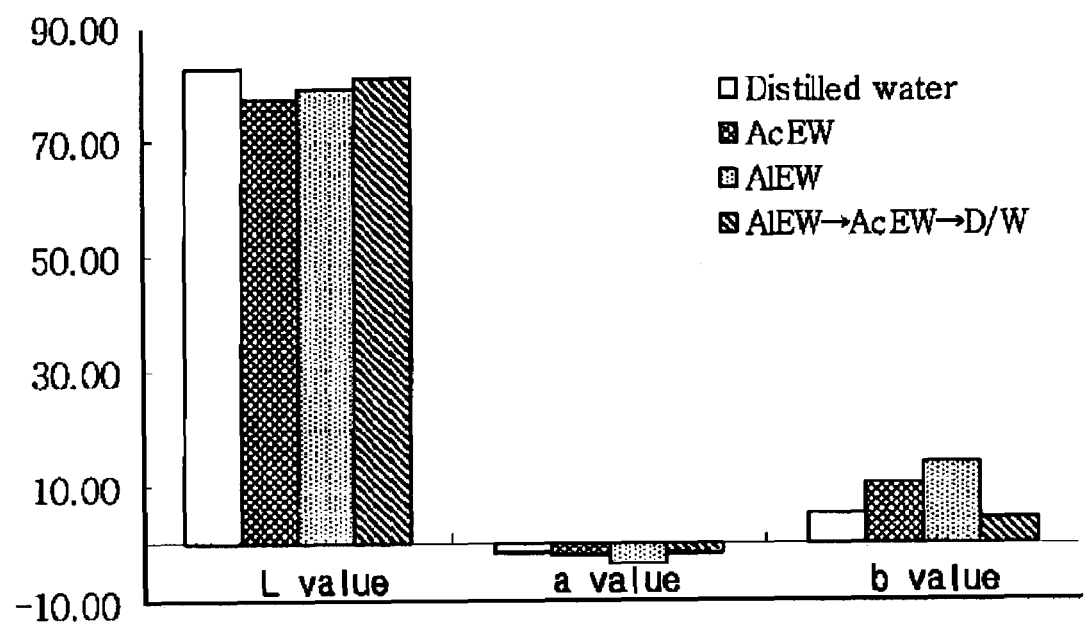
FIG. 2 is a graph of color measured in the example 1.

But as described in FIG. 2, when the rice was treated with a combination of three types of electrolytic waters, the color change was similar to the result induced by treating the rice with distilled water. From the result described in FIG. 1 and FIG. 2, it is concluded that the combination treatment of electrolytic waters (AlEW→AcEW→D/W) makes possible the preliminary treatment of rice without quality deterioration. The result of sterilization experiment is described in FIG. 3.

General bacteria are titled "common-micro" in drawings, and heat-resistant bacteria as "heat-resist".

Figure 3:
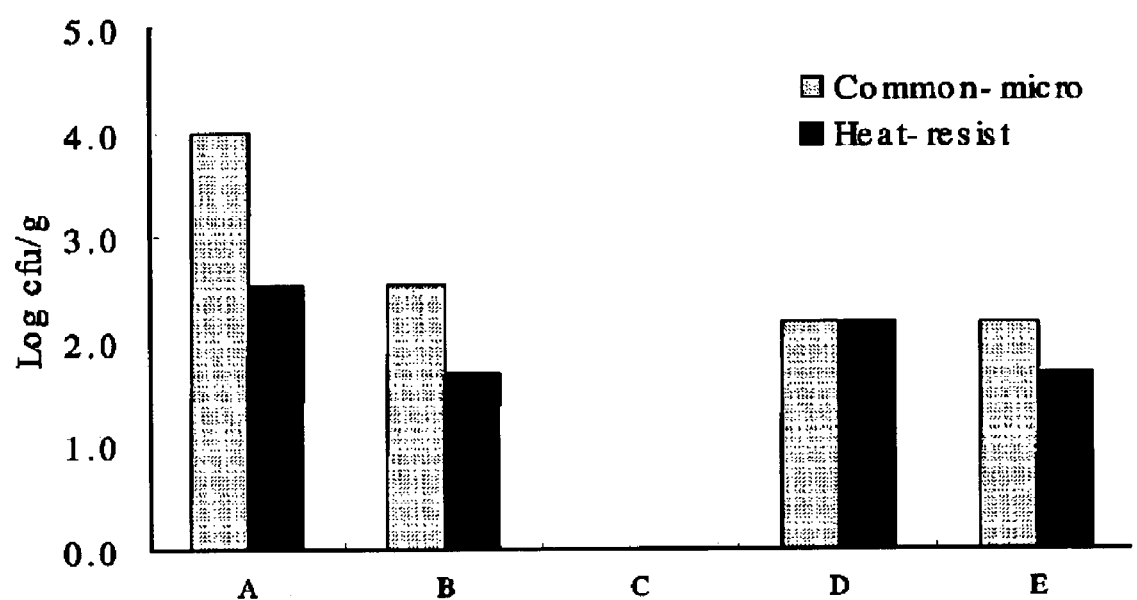
FIG. 3 is a graph describing the result of the sterilization in example 1.

In FIG. 3, A describes the number of bacteria on the raw rice, B describes the number of bacteria on the rice after washing with strong alkaline electrolytic water (AlEW) with a pH level of 11.7, and C describes the number of bacteria on the rice after being washed with strong alkaline electrolytic water (AlEW) with a pH level of 11.7 and washed with strong acidic electrolytic water (AcEW). D describes the number of bacteria on the rice when it was washed with pH 6.8 distilled water (D/W) and then immersed in strong acidic electrolytic water (AcEW).

E describes the number of bacteria on the rice when it was washed with strong acidic electrolytic water (AcEW) of pH 2.7 and then immersed in strong acidic electrolytic water (AcEW).

Accordingly, it is confirmed that the combination treatment of washing with strong alkaline electrolytic water and immersing in strong acidic electrolytic water(C of FIG. 3) has a remarkable germicidal effect.

EXAMPLE 2

Figure 4:
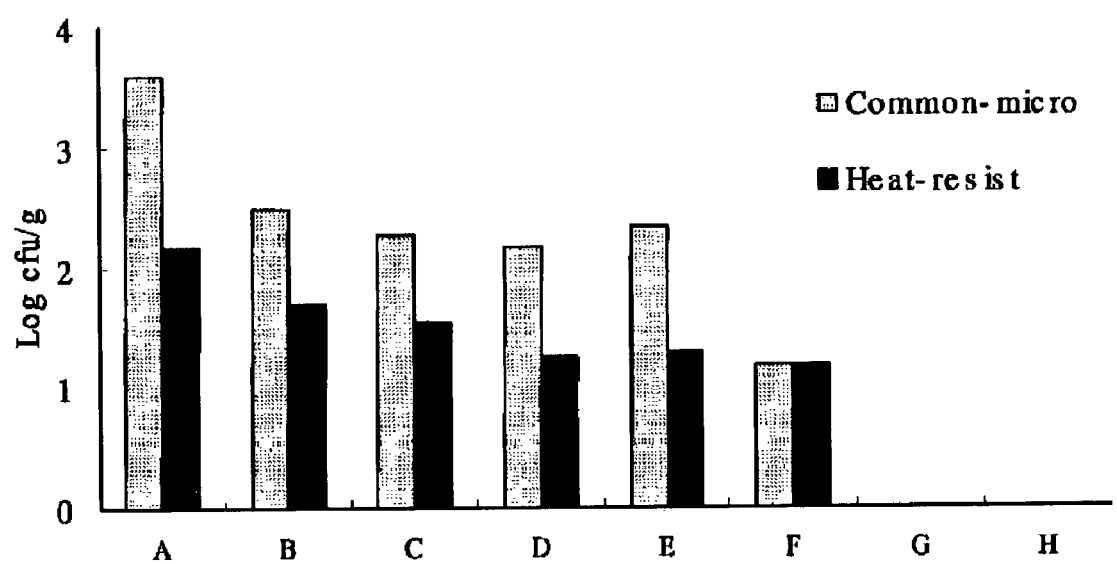
FIG. 4 is a graph describing the change in bacteria levels according to the processes in the example 2.

To validate the decline of the number of bacteria in rice during washing and immersion, the process of manufacturing rice cake was used. In FIG. 4, A describes the number of bacteria on the raw rice and B describes the number of bacteria on the rice after washing with pH 6.8 distilled water (D/W). C describes the number of bacteria on the rice when it was washed with and immersed in distilled water. D describes the number of bacteria on the rice when it was immersed in pH 6.8 distilled water (D/W) subsequently. E describes the number of bacteria on the rice mixture when other submaterials were added into the rice and they are crushed. F describes the number of bacteria of the crushed material after heating at 100° C. for 30 min, G at 110° C. for 30 min, and H at 130° C. for 30 min. From the results described in FIG. 4, it becomes clear that the general treatments of washing and immersion do not diminish the presence of heat-resistant bacteria, and it is confirmed that high-temperature heating treatment over 110° C. is required to sterilize the spores of heat-resistant bacteria.

EXAMPLE 3

Figure 5:
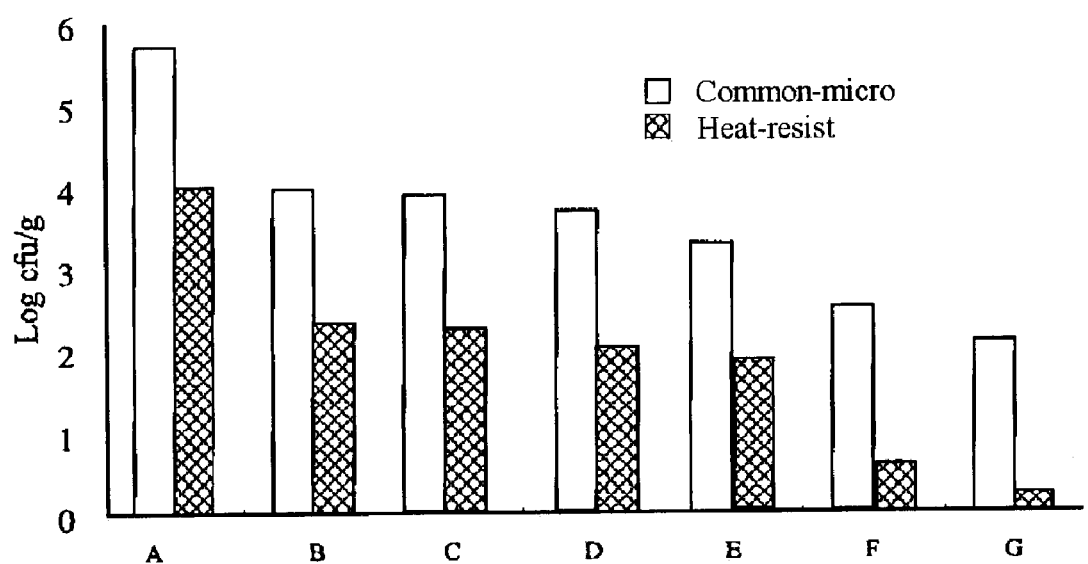
FIG. 5 is a graph describing the numbers of the general bacteria and heat-resistant bacteria measured in the example 3.

To examine more clearly the germicidal effect to the heat-resistant spores, which creates problems in preserving rice products, the number of bacteria is measured after heat-resistant spore (*Bacillus subtilis*) suspension is spread onto the raw rice, and the rice is washed and immersed with distilled water and electrolytic water. After 100 ml spore suspension of $10^8$ cfU/ml is spread on, the raw rice was left as it was for 10 min. Then, the rice was washed with and immersed in distilled water and the behavior of bacteria was detected. The results of the detection are described in FIG. 5. In FIG. 5, A describes the number of bacteria on the raw rice, B describes the number of bacteria on the rice after being washed with pH 6.8 distilled water (D/W), and C describes the number of bacteria on the rice after being washed with pH 6.8 distilled water (D/W). D describes the number of bacteria on the rice when it was immersed in pH 6.8 distilled water (D/W) for 30 min subsequently. E describes the number of bacteria on the rice when it was washed with strong alkaline electrolytic water (AIEW) of pH 11.7. F describes the number of bacteria on the rice when it was washed with strong alkaline electrolytic water of pH 11.7 (AIEW) and then immersed in strong acidic electrolytic water (AcEW) for 30 min. G describes the number of bacteria on the rice when it was washed with strong alkaline electrolytic water (AIEW), and then immersed in strong acidic electrolytic water (AcEW) for 30 min and then immersed in pH 6.8 distilled water (D/W). From FIG. 5, it is confirmed that the decline of the number of general bacteria and heat-resistant bacteria ranges between 1/100 and 1/10.

On the other hand, the sterilization method according to the present invention, which is composed of preliminary contact treatment with alkaline aqueous solution and immersion treatment in strong acid water, makes it possible to reduce the number of bacteria below the detection limit.

Accordingly, the sterilization method of the present invention is effective in disinfection and, at the same time, does not reduce the quality of rice and processed rice foodstuffs.

INDUSTRIAL APPLICABILITY

As described above, the present invention provides a sterilization method, which is effective in disinfection and does not reduce the quality of rice and processed rice foodstuffs, where preliminary contact with alkaline aqueous solution and immersion treatment in strong acid water are conducted. That is to say, the sterilization method of the present invention is a non-heating sterilization and effective in killing heat-resistant spore forming bacteria in rice. In the present invention, because heating treatment in high-temperature is not necessary the quality is not degraded.

With acid water treatment, the chlorine odor, left in spite of carrying out the heating process, alters the product's taste and the discoloration due to the low pH of treatment solution compromises the quality of processed materials. In contrast, in the sterilization method of the present invention, rice and processed rice foodstuffs obtained by heating exude a desirable color and odor, and there is no degradation in taste.

Additionally, the volume of chemicals used in the method of the present invention is so small that safety of the processed product is guaranteed. The present invention is also applicable to agricultural products, such as vegetables.

The invention claimed is:

1. A sterilization method for rice and processed rice foodstuffs including cooking and heating processes, wherein the rice is a brown rice or polished rice, comprising the steps of:

washing the rice or the processed rice foodstuffs with alkaline electrolyzed water having a pH of 10-12 for 5 minutes;

conducting immersion treatment of the alkaline-washed rice in strong acidic electrolyzed water having a pH of 2.2-2.7 for 30 min; and conducting immersion treatment in distilled water for 30 minutes for sterilization of the rice and processed rice foodstuffs before the cooking and heating processes.

2. The sterilization method of rice and processed rice foodstuffs according to claim 1 wherein said alkaline electrolyzed water or said acidic electrolyzed water is obtained by an electrolytic water producer under the state of adding salt.

3. The sterilization method of rice and processed rice foodstuffs according to claim 1 wherein said alkaline electrolyzed water or said acidic electrolyzed water is obtained by an electrolytic water producer under the state of not adding salt.

* * * * *